(12) United States Patent
White et al.

(10) Patent No.: US 6,300,869 B1
(45) Date of Patent: Oct. 9, 2001

(54) ALARM SYSTEM AND METHOD FOR VEHICLE

(76) Inventors: Bruce J. White, RFD #2, Argyle, NY (US) 12809; Wayne A. White, 253 Broadway, Fort Edward, NY (US) 12828

(*) Notice: Subject to any disclaimer, the term of this patent is extended or adjusted under 35 U.S.C. 154(b) by 0 days.

(21) Appl. No.: 09/616,607

(22) Filed: Jul. 14, 2000

(51) Int. Cl.$^7$ ..................................................... B60Q 1/00
(52) U.S. Cl. ..................... 340/457; 340/457.1; 340/459; 340/438; 180/271; 180/286
(58) Field of Search .................................. 340/457, 457.1, 340/459, 461, 438, 460; 180/271, 286; 701/29; 307/9.1, 10.1, 10.6

(56) References Cited

U.S. PATENT DOCUMENTS

| | | | |
|---|---|---|---|
| 3,906,441 | 9/1975 | Andersen et al. | 340/457.1 |
| 3,922,672 | 11/1975 | Birt et al. | 340/457.1 |
| 4,072,925 | * 2/1978 | Yashima et al. | 340/438 |
| 4,096,468 | 6/1978 | Kopera, Jr. | 340/457.1 |
| 4,555,690 | 11/1985 | Fukushima et al. | 340/457 |
| 4,785,280 | * 11/1988 | Fubini et al. | 340/438 |
| 4,855,709 | * 8/1989 | Naderi | 340/438 |
| 4,896,741 | 1/1990 | Kawai et al. | 180/268 |
| 5,121,112 | * 6/1992 | Nakadozono | 340/870.16 |
| 5,585,781 | * 12/1996 | Sumida | 340/459 |
| 5,648,755 | * 7/1997 | Yagihashi | 340/439 |
| 6,166,631 | * 12/2000 | Kennedy et al. | 340/457.3 |

FOREIGN PATENT DOCUMENTS

| | | |
|---|---|---|
| 1 454 978 | 11/1976 | (GB). |
| 2 088 608 | 6/1982 | (GB). |

\* cited by examiner

*Primary Examiner*—Daniel J. Wu
*Assistant Examiner*—Toan Pham
(74) *Attorney, Agent, or Firm*—Hoffman, Warnick & D'Alessandro LLC; Spencer K. Warnick

(57) ABSTRACT

An alarm system for a vehicle having a door and a seat belt that includes: a door position sensor; a seat belt position sensor; an alarm, operable when the vehicle is running, that sounds only when the door position sensor determines the door is open and the seat belt position sensor determines the seat belt is inactive. A method of preventing unsafe vehicle operation and a vehicle having the alarm system are also disclosed.

13 Claims, 4 Drawing Sheets

ALARM SYSTEM AND METHOD FOR VEHICLE

BACKGROUND OF THE INVENTION

1. Technical Field

The present invention relates generally to a vehicle alarm system and, more particularly, to a vehicle alarm system and method for sounding an alarm only when a vehicle door is open and a seat belt is inactive.

2. Related Art

Almost all motor vehicles produced today have warning systems for certain vehicle conditions. For instance, U.K. Pat. No. 1,454,978 discloses a system that may warn a user when a vehicle door has been opened and the keys are still in the ignition or the lights are on.

One particular situation that is not addressed by the prior art is the combined evaluation of door position and seat belt position. An example of where this type operation is necessary is the motorized delivery vehicle field. In this field, it is convenient for a driver or occupant of a vehicle to leave their seat belt inactive and/or a door of the vehicle open so they may enter and exit the vehicle frequently. However, when both a door is open and a seat belt is inactive, an unsafe condition exists. For instance, it is possible for a driver to exit a running vehicle, which can potentially cause injury to the driver. Injury may also result to anyone, or anything, in proximity of the vehicle if the vehicle moves.

To prevent this occurrence, United States Postal Service regulations mandate that running delivery vehicles either have the driver door closed or the driver seat belt activated. Unfortunately, there is no alarm system that sounds only when both a door is open and a seat belt is disconnected.

Another shortcoming of prior art devices is that many turn off after a certain amount of time, i.e., they time out. As a result, a user becomes accustom to ignoring warning systems and potentially may operate a vehicle in an unsafe manner. Furthermore, a pedestrian may unknowingly enter an area where a vehicle is driverless and the alarm has timed out.

In view of the foregoing, there is a need in the art for an alarm system and method for a motor vehicle that sounds when both a seat belt is inactive and a door is open.

SUMMARY OF THE INVENTION

The invention provides a vehicle alarm system for a vehicle having a door and a seat belt, the vehicle alarm system comprising: a door position sensor; a seat belt position sensor; an alarm, operable when the vehicle is running, that sounds only when the door position sensor determines the door is open and the seat belt position sensor determines the seat belt is disconnected. The invention provides an alarm system that prevents unsafe operation of a delivery vehicle. The system may advantageously continue sounding until the unsafe condition is remedied.

In a second aspect of the invention is provided an alarm system for a motor vehicle having a door and a seat belt, the system comprising: first means for sensing when a door of the motor vehicle is open or closed; second means for sensing when a seat belt of the motor vehicle is active or inactive; and means for sounding an alarm, coupled to the first means and the second means, only when both the door is open and the seat belt is inactive.

A third aspect of the invention includes a method of preventing unsafe operation of a motor vehicle comprising the steps of: determining whether the motor vehicle is operative; determining whether a door of the motor vehicle is open or closed; determining whether a seat belt of the motor vehicle is active or inactive; and sounding an alarm when the motor vehicle is operative and both the door is open and the seat belt is inactive.

In a fourth aspect of the invention is provided a vehicle comprising: a motive power source for driving wheels of the vehicle; a battery; a door; a seat having a seat belt; and an alarm system having: a door position sensor; a seat belt position sensor; and an alarm that sounds only when the door position sensor determines the door is open and the seat belt position sensor determines the seat belt is inactive.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

Figure 1:
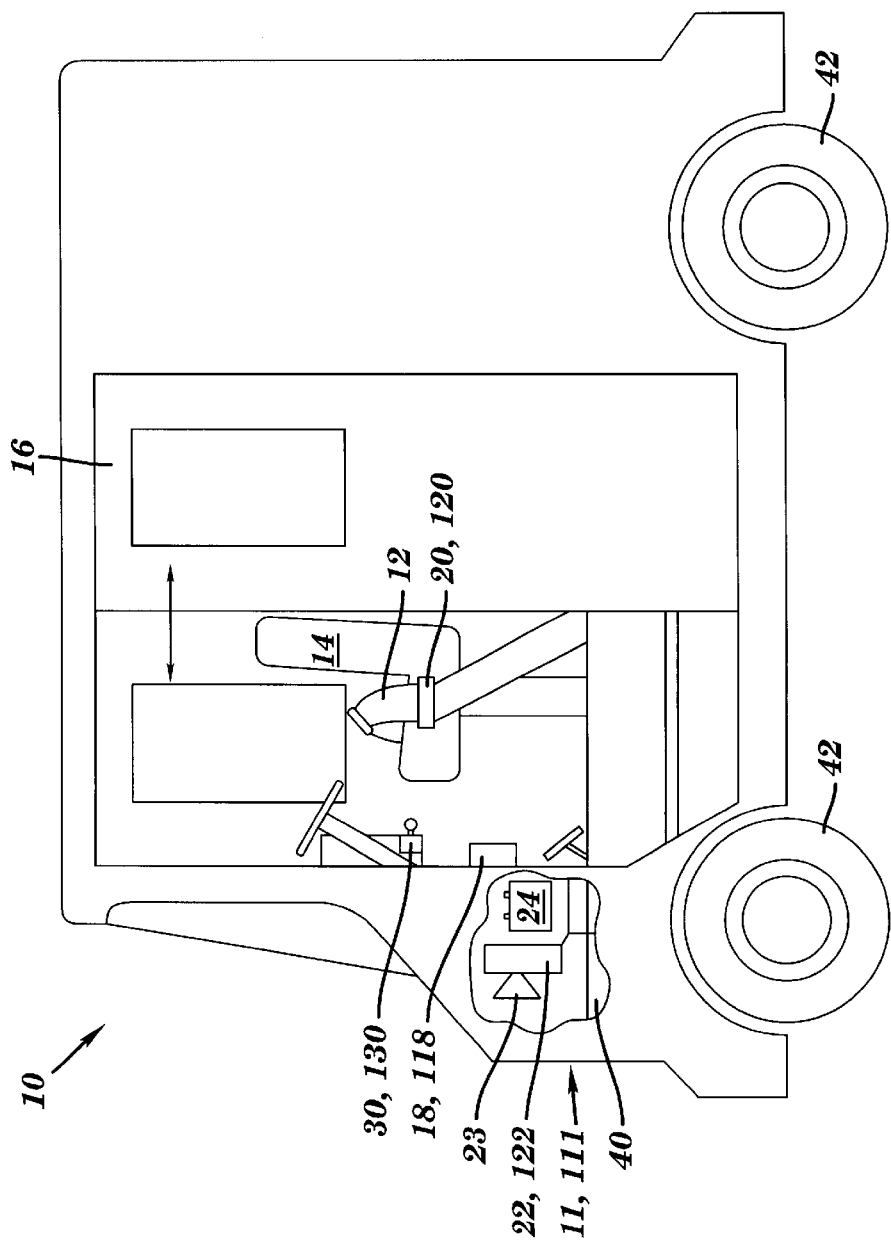
FIG. 1 shows a vehicle having a vehicle alarm system in accordance with the invention.

Referring to FIG. 1, a vehicle 10 including a vehicle alarm system 11 in accordance with the invention is shown. As will become evident, vehicle alarm system 11 in accordance with the present invention provides an alarm sound only under the unsafe condition of a vehicle door being open and a seat belt of the vehicle being inactive, e.g., disconnected. For purposes of this disclosure, the use of the term "inactive" to describe seat belt position is meant to capture any situation in which a seat belt is not in proper use, e.g., is disconnected, spooled, etc. Similarly, "activated" is meant to capture any situation in which a seat belt is in proper use, e.g., connected, coupled, unspooled, etc. In like manner, the term "open" as it is applied to a vehicle door may be any state in which the door is not properly secured, i.e., closed. Hence, an "open" door 16 may not simply be open such that a user may exit through it, an "open" door 16 may be, for example, ajar, unlocked, etc.

Vehicle 10 includes a seat belt 12 for securing an occupant (not shown) to a seat 14 and a door 16. While seat 14 is shown as being a driver seat, the teachings of the present invention may be applied to any seat of a vehicle. Similarly, while door 16 is shown as a sliding door, it may be any type of vehicle door known to those skilled in the art. In accordance with the invention, a vehicle alarm system 11 is provided on vehicle 10. Alarm system 11 generally includes a door position sensor 18 and a seat belt position sensor 20 and an alarm 22. Alarm 22 includes a speaker 23 or some other sounding mechanism capable of alerting an occupant or those in proximity to vehicle 10 of an unsafe condition. Alarm 22 is preferably provided within an engine compartment of vehicle 10 and may be a part of vehicle 10 horn system as is known in the art.

Figure 2:
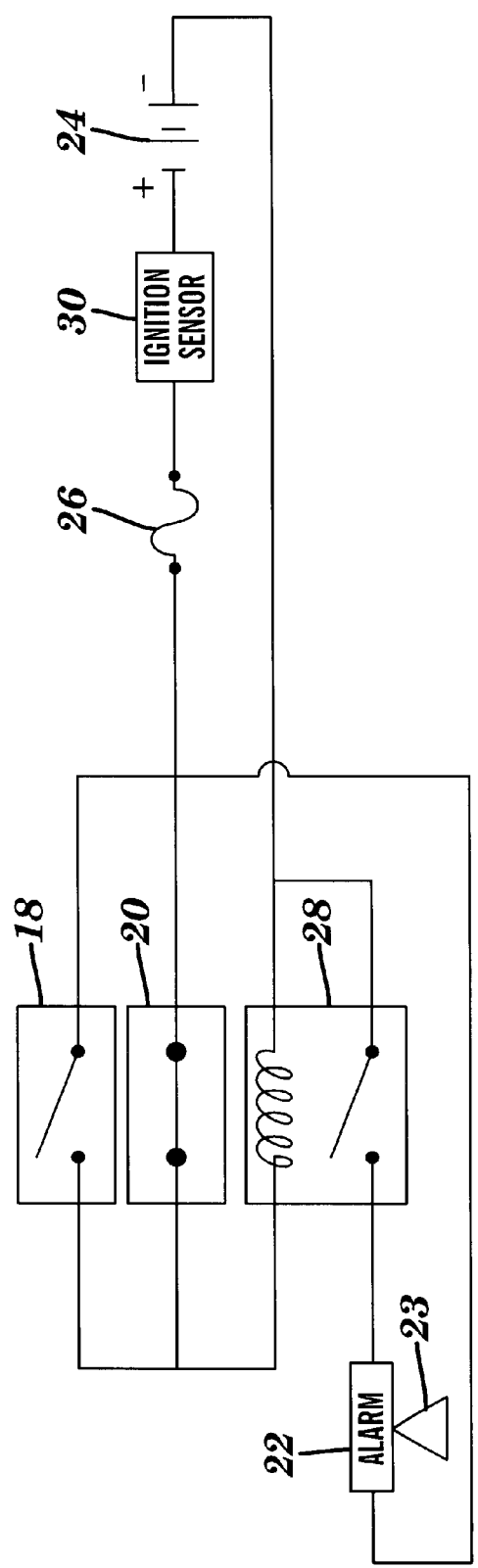
FIG. 2 shows a first preferred embodiment of the vehicle alarm system.

Referring to FIG. 2, a first preferred embodiment of vehicle alarm system 11 is shown. In this embodiment, door position sensor 18 is coupled to seat belt position sensor 20 in a parallel electrical circuit. Energy is preferably provided to system 11 by vehicle battery 24 through a fuse 26. A relay 28 is positioned between sensors 18, 20 and alarm 22. Relay 28 is energized to sound alarm 22 only upon the condition that door position sensor 18 determines that door 16 is open and seat belt position sensor 20 determines seat belt 12 is inactive. In a preferred setting, alarm system 11 also includes an ignition sensor 30 that energizes system 11 only when vehicle 10 is operating, e.g., the vehicle engine is running.

With special regard to seat belt position sensor 20, one with skill in the art will recognized that a number of different sensors that operate in different fashions are available. For instance, sensors may detect whether the male and female parts of a seat belt are coupled or whether an amount of belt has been fed from a seat belt spool. Accordingly, any type of seat belt position sensor that determines inactivity of seat belt 12 may be suited.

In the preferred embodiment of FIG. 2, when door 16 is open, door position sensor 18 is in a non-conductive state, and while seat belt 12 is inactive, seat belt position sensor 20 is in a non-conductive state. Accordingly, FIG. 2 shows alarm system 11 in an inoperative mode because seat belt position sensor 20 determines that seat belt 12 is active (i.e., conductive state), which energizes relay 28 to prevent energizing of alarm 22. In this instance, door position sensor 18 indicates that door 16 is open, i.e., sensor 18 is in a non-conductive state.

Figure 3:
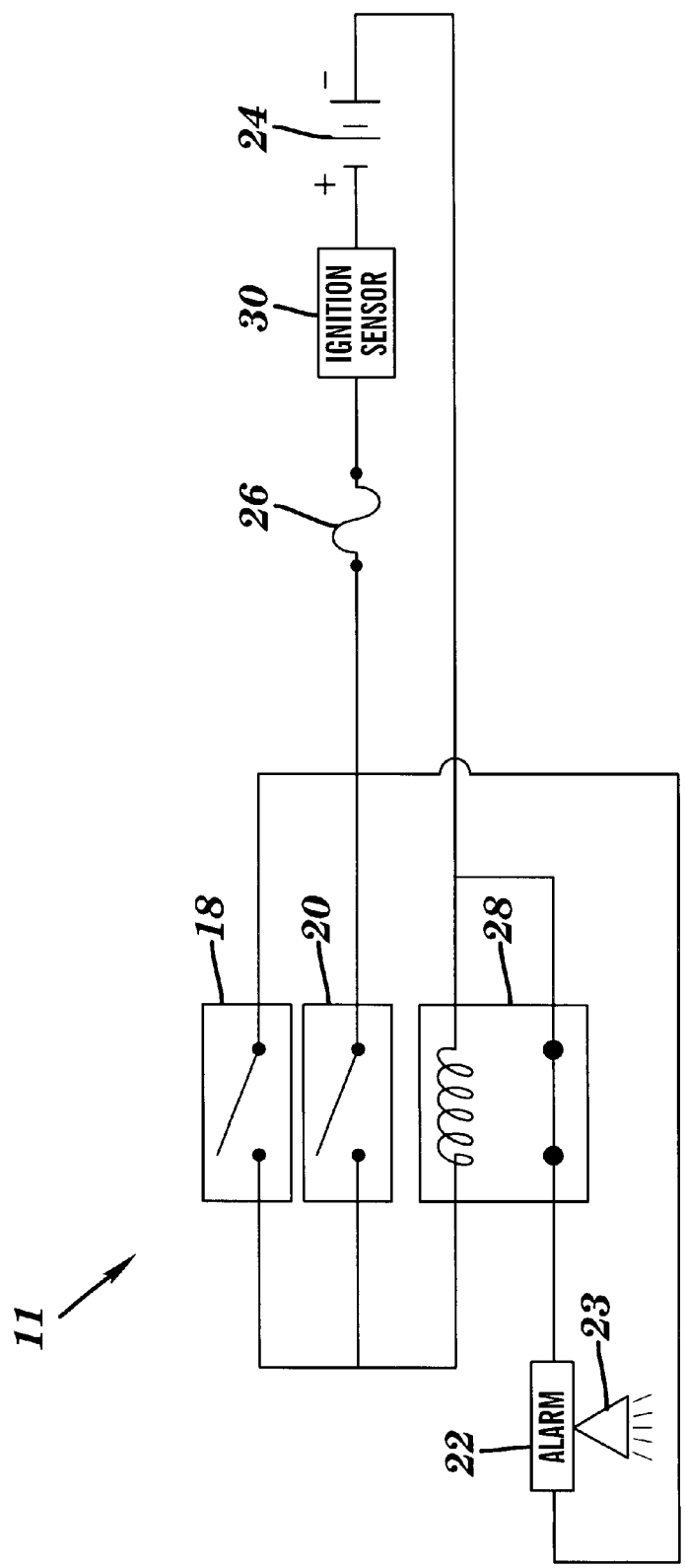
FIG. 3 shows the first preferred embodiment of the vehicle alarm system in an operative mode.

As shown in FIG. 3, when both seat belt 12 is inactive and door 16 is open, relay 28 is not energized and alarm 22 is energized, hence, sounding an alarm that warns an occupant or those in proximity of vehicle 10 of an unsafe condition. The alarm continues until either door 16 is closed or seat belt 12 is activated. Accordingly, the alarm will not stop until the unsafe condition is remedied, i.e., it does not time out.

It should be recognized that a number of door position sensors 20 may be provided to accommodate a multiple doored vehicle 10. Similarly, more than one seat belt position sensor 18 may be provided to accommodate all seats within a vehicle 10. These components could be added in parallel to the already described sensors 18, 20.

Figure 4:
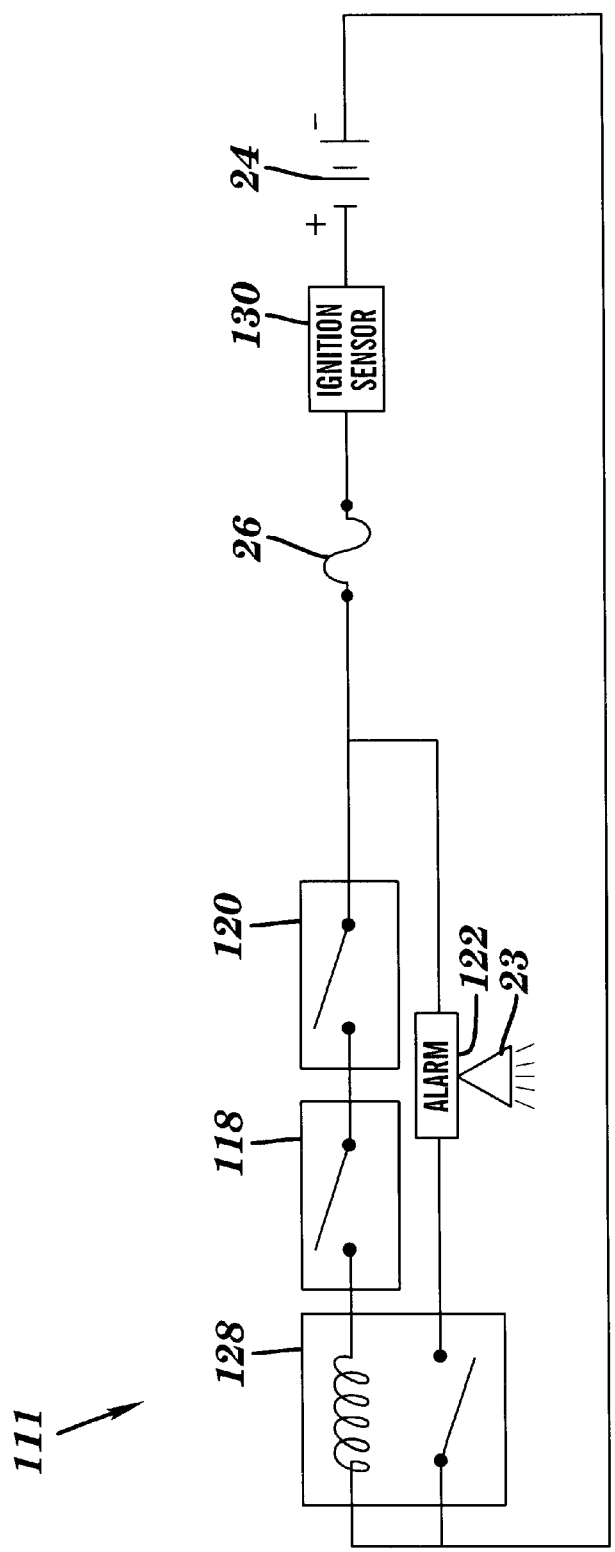
FIG. 4 shows a second preferred embodiment of the vehicle alarm system.

FIG. 4 shows a second preferred embodiment of alarm system 111 in which sensors 118, 120 are coupled in a series electrical circuit. In this embodiment, door position sensor 118 and seat belt position sensor 120 are shown in a condition in which door 16 is closed and seat belt 12 is activated. In this embodiment, when door 16 is closed, door position sensor 118 is in a non-conductive state, and while seat belt 12 is activated, seat belt position sensor 120 is in a non-conductive state. As shown in FIG. 4, alarm system 111 is inoperative. Only when both door 16 is open and seat belt 12 is uncoupled will sensors 118 and 120 conduct current to energize relay 128 and, hence, energize alarm 122 to sound. Similarly to the first embodiment, the second embodiment may also include an ignition sensor 130 between battery 24 and the rest of the circuitry.

Similar to the first embodiment, a number of door position sensors 120 may be provided to accommodate a multiple doored vehicle 10 and more than one seat belt position sensor 118 may be provided to accommodate all seats within a vehicle 10. These components could be added in series adjacent the already described sensors 118, 120.

It should be recognized that while sensors 18, 20, 118, 120 have been illustrated as switch sensors that a variety of different sensors, e.g., pressure sensors, infrared sensors, etc., may also be suited for operation in the invention. The scope of the invention should, therefore, not be limited to any one type of sensor.

The invention also includes a method of preventing unsafe operation of a motor vehicle comprising the steps of: determining when motor vehicle 10 is operative; determining whether door 16 of motor vehicle 10 is open or closed; determining whether a seat belt 12 of motor vehicle 10 is coupled or uncoupled; and sounding an alarm 22, 122 when motor vehicle 10 is operative and both door 16 is open and seat belt 12 is inactive.

Returning to FIG. 1, the invention also includes a vehicle 10 having an alarm system 11, 111. Vehicle 10 includes: a motive power source 40 (e.g., engine, motor, etc.) for driving wheels 42 of vehicle 10, a battery 24, a door 16, a seat 14 having a seat belt 12, and an alarm system having a door position sensor 18, a seat belt position sensor 20 and an alarm 22 that sounds only when door position sensor 18 determines door 16 is open and seat belt position sensor 20 determines seat belt 12 is inactive. Vehicle 10 may also include an ignition sensor 30 for determining when vehicle 10 is running. Alarm 22 of vehicle 10 may include a speaker 23 or other sounding mechanism and is powered by battery 24 of vehicle 10.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

We claim:

1. A vehicle alarm system for a vehicle having a door and a seat belt, the vehicle alarm system comprising:
   a door position sensor;
   a seat belt position sensor; and
   an alarm, operable when the vehicle is running, that sounds only when both the door position sensor determines the door is open and the seat belt position sensor determines the seat belt is inactive.

2. The vehicle alarm system of claim 1, further comprising an ignition sensor for determining when the vehicle is running.

3. The vehicle alarm system of claim 1, wherein the door sensor and the seat belt position sensor are coupled in parallel.

4. The vehicle alarm system of claim 1, further comprising a relay for energizing the alarm when the door position sensor determines the door is open and the seat belt position sensor determines the seat belt is inactive.

5. The vehicle alarm system of claim 1, wherein the door position sensor and the seat belt position sensor are coupled in series.

6. The vehicle alarm system of claim 1, wherein the alarm includes a speaker.

7. The vehicle alarm system of claim 1, wherein the system is powered by a battery of the motor vehicle.

8. The vehicle alarm system of claim 1, further comprising a fuse.

9. An alarm system for a motor vehicle having a door and a seat belt, the system comprising:
   first means for sensing when a door of the motor vehicle is open or closed;
   second means for sensing when a seat belt of the motor vehicle is active or inactive; and
   means for sounding an alarm, coupled to the first means and the second means, only when both the door is open and the seat belt is inactive.

10. A method of preventing unsafe operation of a motor vehicle comprising the steps of:
   determining whether the motor vehicle is operative;
   determining whether a door of the motor vehicle is open or closed;
   determining whether a seat belt of the motor vehicle is active or inactive; and
   sounding an alarm when the motor vehicle is operative and both the door is open and the seat belt is inactive.

11. A vehicle comprising:
   a motive power source for driving wheels of the vehicle;
   a battery;
   a door;
   a seat having a seat belt; and
   an alarm system having:
      a door position sensor;
      a seat belt position sensor; and
      an alarm that sounds only when both the door position sensor determines the door is open and the seat belt position sensor determines the seat belt is inactive.

12. The vehicle of claim 11, further comprising an ignition sensor for determining when the vehicle is running.

13. The vehicle of claim 11, wherein the alarm includes a speaker.

* * * * *